US008523488B2

(12) United States Patent
Bregonzio et al.

(10) Patent No.: US 8,523,488 B2
(45) Date of Patent: Sep. 3, 2013

(54) PIPE-JOINING METHOD AND SYSTEM FOR PRODUCING UNDERWATER PIPELINES AND UNDERWATER-PIPELINE-LAYING VESSEL COMPRISING SUCH A SYSTEM

(75) Inventors: Valerio Bregonzio, San Giuliano Milanese (IT); Antonio Passerini, Pavia (IT)

(73) Assignee: Saipem S.p.A., San Donato, Milanese (IT)

( * ) Notice: Subject to any disclaimer, the term of this patent is extended or adjusted under 35 U.S.C. 154(b) by 834 days.

(21) Appl. No.: 12/450,701

(22) PCT Filed: Apr. 9, 2008

(86) PCT No.: PCT/IB2008/000863
§ 371 (c)(1),
(2), (4) Date: Jan. 12, 2010

(87) PCT Pub. No.: WO2008/122879
PCT Pub. Date: Oct. 16, 2008

(65) Prior Publication Data
US 2010/0143041 A1    Jun. 10, 2010

(30) Foreign Application Priority Data
Apr. 10, 2007   (IT) .............................. MI2007A0726

(51) Int. Cl.
*F16L 1/12*    (2006.01)
(52) U.S. Cl.
USPC ...................................... 405/170; 285/288.1

(58) Field of Classification Search
USPC ............................... 405/169, 170; 285/288.1
See application file for complete search history.

(56) References Cited

U.S. PATENT DOCUMENTS

| | | | |
|---|---|---|---|
| 3,300,187 A | 1/1967 | Krogstad et al. | |
| 3,470,057 A | 9/1969 | Stuart et al. | |
| 3,720,069 A | * 3/1973 | Lockridge | ..................... 405/166 |
| 4,257,718 A | 3/1981 | Rosa et al. | |
| 4,574,023 A | 3/1986 | Edwards et al. | |
| 4,591,294 A | * 5/1986 | Foulkes | ......................... 405/170 |
| 4,907,651 A | 3/1990 | Bou-Mikael | |

(Continued)

FOREIGN PATENT DOCUMENTS

| | | |
|---|---|---|
| DE | 102004056462 | 6/2006 |
| EP | 1013514 | 7/2000 |

(Continued)

OTHER PUBLICATIONS

International Search Report Apr. 29, 2008 in PCT/EP2007/064524.

(Continued)

*Primary Examiner* — Tara M. Pinnock
(74) *Attorney, Agent, or Firm* — Davidson Berquist Jackson & Gowdey, LLP

(57) ABSTRACT

A method of joining pipes to produce an underwater pipeline on a firing line includes supplying the firing line with pipes having previously roughened end portions; welding the end portions of adjacent pipes to form cutbacks, each of which is defined by two end portions, and by an annular weld bead between the two end portions; cleaning, by cryogenic blasting, the outer surface of each cutback; and forming a protective joint coating about each cutback.

16 Claims, 4 Drawing Sheets

(56) References Cited

U.S. PATENT DOCUMENTS

| | | | |
|---|---|---|---|
| 4,913,080 A | | 4/1990 | Kindem et al. |
| 5,365,699 A | * | 11/1994 | Armstrong et al. ............. 451/7 |
| 5,395,454 A | * | 3/1995 | Robert ............................ 134/6 |
| 5,916,468 A | | 6/1999 | Akiyama et al. |
| 6,044,787 A | | 4/2000 | Elmbo |
| 6,065,781 A | | 5/2000 | Titus |
| 6,238,545 B1 | | 5/2001 | Allebach et al. |
| 6,440,245 B1 | | 8/2002 | Culzoni |
| 7,093,860 B2 | | 8/2006 | Fawley |
| 2004/0145178 A1 | | 7/2004 | Ball |
| 2005/0244578 A1 | * | 11/2005 | Van Egmond et al. ....... 427/230 |
| 2010/0133324 A1 | | 6/2010 | Leiden et al. |

FOREIGN PATENT DOCUMENTS

| | | |
|---|---|---|
| EP | 1217276 | 6/2002 |
| FR | 1394983 | 4/1965 |
| FR | 2723006 | 2/1996 |
| GB | 899644 | 6/1962 |
| GB | 2232740 | 12/1990 |

OTHER PUBLICATIONS

U.S. Appl. No. 12/385,794—Mar. 9, 2010 PTO Office Action.
U.S. Appl. No. 12/448,194—Jun. 21, 2010 PTO Office Action.
U.S. Appl. No. 12/385,794—Sep. 22, 2010 PTO Office Action.
European Search Report mailed Apr. 29, 2008 in PCT Application No. PCT/EP2007/064524.
International Search Report and Written Opinion mailed Dec. 17, 2008 in PCT/IB2008/000863.
International Search Report and Written Opinion mailed Jul. 25, 2008 in PCT/IB2008/000441.
International Search Report mailed Jan. 31, 2008 in Application PCT/EP2007/061118.
U.S. Appl. No. 12/448,194—Dec. 3, 2010 PTO Office Action.
U.S. Appl. No. 12/385,794—Sep. 8, 2011 PTO Office Action.
U.S. Appl. No. 12/449,049—Dec. 15, 2011 PTO Office Action.
International Preliminary Report on Patentability and Written Opinion in PCT Appln. No. PCT/EP2007/061118, mailed Apr. 22, 2009.
U.S. Appl. No. 12/385,794—Mar. 21, 2011 PTO Office Action.
U.S. Appl. No. 12/385,794—Mar. 24, 2011 PTO Office Action.
U.S. Appl. No. 12/448,194—Mar. 31, 2011 PTO Office Action.

* cited by examiner

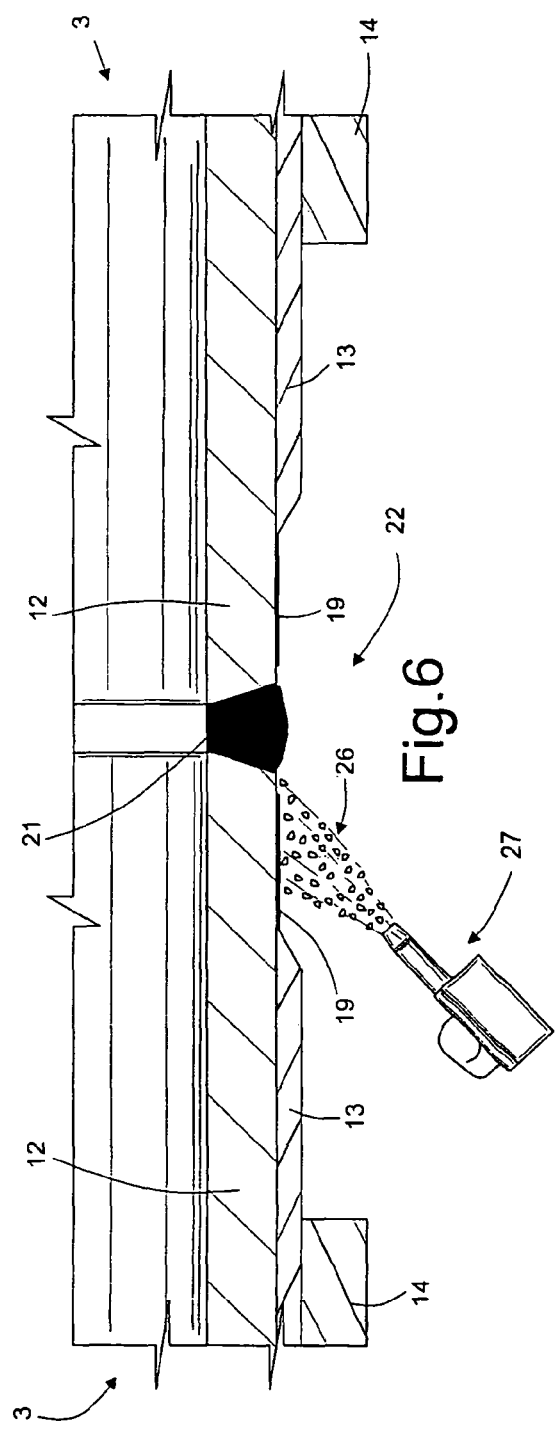
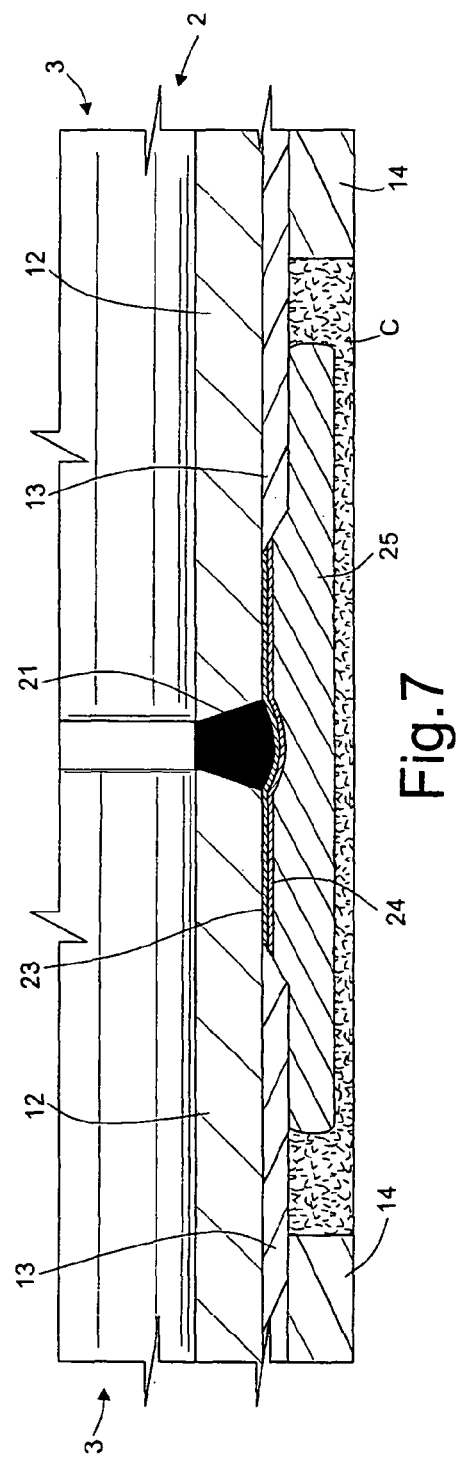

PIPE-JOINING METHOD AND SYSTEM FOR PRODUCING UNDERWATER PIPELINES AND UNDERWATER-PIPELINE-LAYING VESSEL COMPRISING SUCH A SYSTEM

TECHNICAL FIELD

The present invention relates to a pipe-joining method for producing an underwater pipeline.

More specifically, the present invention relates to a pipe-joining method which comprises welding the end portions of adjacent pipes to form annular joint portions known as cutbacks, each of which is defined by two end portions, and by an annular weld bead between the two end portions; and forming a protective joint coating about each cutback.

BACKGROUND ART

Underwater pipelines comprise a number of pipes joined to total lengths of hundreds of kilometers. The pipes are of normally 12-metre unit length, and relatively large diameters ranging between 0.2 and 1.5 metres, and each comprise a steel cylinder; a first coating of polymer material to protect the steel pipe; and possibly a second coating of Gunite or cement to weigh down the pipe. In some applications, the pipes and underwater pipelines do not need and therefore have no second coating.

To weld the steel cylinders to one another, the end portions of each pipe have no first or second coating. The pipes are joined at on-land installations into multiple-unit-length pipes, as well as on pipeline-laying vessels, on which unit-length or multiple-unit-length pipes are joined to others already joined to other pipes to form part of the underwater pipeline.

The actual joining operation comprises welding the steel cylinders, normally in a number of weld passes, and forming the protective joint coating, and possibly also a weighting joint coating. Once the annular weld bead is formed between two steel cylinders, the cutback extends astride the weld, along a portion with no first or second coating. In other words, the cutback is defined substantially by the end portions of the pipes, extends axially between two end portions of the first coating, and must be coated with the protective joint coating to prevent corrosion.

Applying the protective joint coating to the cutback is known as "field joint coating", and comprises coating the cutback with three coats (in some applications, the protective joint coating comprises two coats) to ensure protection and adhesion of the coats to the steel cylinders.

Applying the protective joint coating to the cutback comprises shot blasting to roughen the outer surface of the cutback; heating, e.g. induction heating, the cutback to 250° C.; spraying the cutback with powdered epoxy (FBE—Fusion Bonded Epoxy) resin, which, in contact with the cutback, forms a relatively thin first coat or "primer"; spraying the cutback, on top of the first coat, with a modified copolymer, which acts as adhesive and, in contact with the first coat, forms a relatively thin second coat; applying a third so-called "top coat", which also extends partly over the first coating; and then possibly applying the weighting joint coating.

Welding, non-destructive weld testing, shot blasting, cutback heating, and protective and weighting joint coating are performed at joining stations equally spaced along the path of the pipes (or of the partly formed pipeline, when the pipes are joined to this) on a firing line. The pipes and the partly formed pipeline are therefore fed in steps through the joining stations, and are stopped at each joining station for a length of time determined by the longest operation, which, at present, is shot blasting the cutback.

Shot blasting provides for effectively roughening the outer surface of the cutback, but, in addition to being relatively time-consuming, also has other drawbacks: it calls for the use of large-size shot conveying, recovery, and filtering equipment; and it produces large amounts of dust, which contaminate the workplace and call for the installation of additional dust-extraction equipment.

All these drawbacks are further compounded by the firing line being housed in a tunnel on the vessel, which means very little space is available in which to install the necessary equipment, and the tunnel is quickly saturated with dust.

DISCLOSURE OF INVENTION

It is an object of the present invention to provide a pipe-joining method for producing an underwater pipeline, designed to eliminate the drawbacks of the known art.

According to the present invention, there is provided a method of joining pipes to produce an underwater pipeline on a firing line, the method comprising welding the end portions of adjacent pipes to form cutbacks, each of which is defined by two end portions, and by an annular weld bead between the two end portions; and forming a protective joint coating about each cutback; the method being characterized by supplying the firing line with pipes having previously roughened end portions; and by cleaning, by cryogenic blasting, the outer surface of each cutback along the firing line before applying the protective joint coating.

The present invention also relates to a pipe-joining system for producing underwater pipelines.

According to the present invention, there is provided system for joining pipes to produce an underwater pipeline; the system comprising a firing line for welding the end portions of adjacent pipes to form cutbacks, each defined by two end portions and by an annular weld bead between the two end portions, and for forming a protective joint coating about each cutback; the system being characterized by comprising a cryogenic blasting unit for cleaning, by cryogenic blasting, the outer surface of each cutback along the firing line before applying the protective joint boating; the end portions of the pipes being roughened beforehand, before being fed to the firing line.

The present invention also relates to an underwater-pipeline-laying vessel.

According to the present invention, there is provided an underwater-pipeline-laying vessel comprising a pipe-joining system as claimed.

BRIEF DESCRIPTION OF THE DRAWINGS

A non-limiting embodiment of the present invention will be described by way of example with reference to the accompanying drawings, in which:

FIGS. 6 and 7 show larger-scale sections, with parts removed for clarity, of pipes at various joining stages;

BEST MODE FOR CARRYING OUT THE INVENTION

Figure 1:
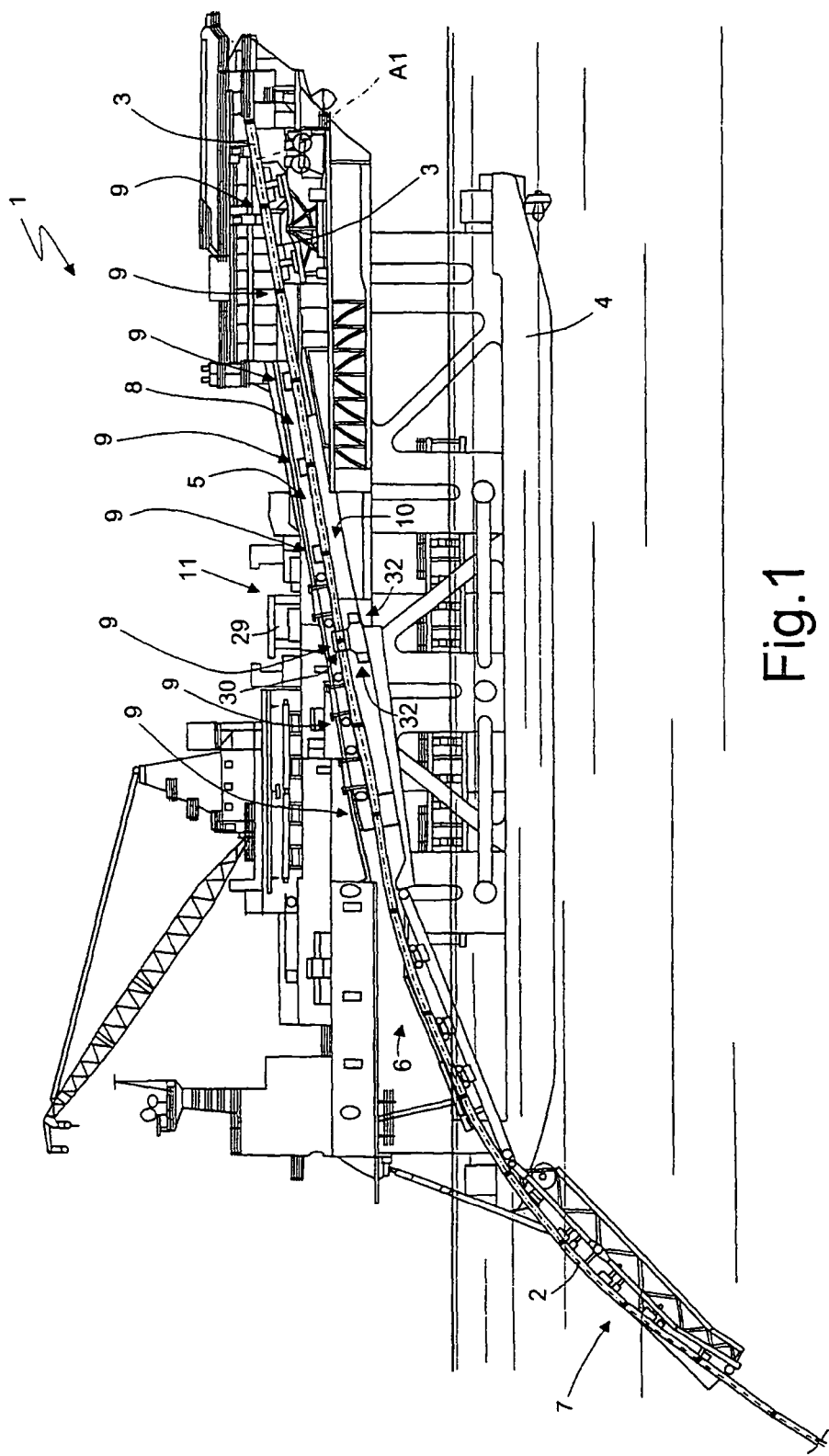
FIG. 1 shows a side view, with parts removed for clarity, of an underwater-pipeline-laying vessel implementing the method according to the present invention.

Number 1 in FIG. 1 indicates a pipeline-laying vessel in the process of producing and laying in the sea (SL indicates sea level) an underwater pipeline 2 comprising pipes 3 joined to one another. Vessel 1 comprises buoyancy hulls 4; an above-water tunnel 5; a partly above-water, inside ramp 6; an underwater outside ramp 7; and a firing line 8 extending inside tunnel 5.

The partly formed underwater pipeline 2 and pipes 3 aligned with it and ready for joining extend along an axis A1 on firing line 8, which comprises a number of joining stations 9 equally spaced along axis A1, and each for performing a joining operation.

Firing line 8 forms part of a joining system 10, which comprises a conveyor (not shown) for pipes 3 and partly formed underwater pipeline 2; welding units (not shown); non-destructive test units (not shown); a cryogenic blasting unit 11 shown schematically in FIG. 1; and joint coating units (not shown).

The distance between adjacent joining stations 9 equals the standard length, about 12 metres, of each pipe 3, or a multiple of the standard length, when joining, along firing line 8, multiple-standard-length pipes 3 joined beforehand at on-land installations or off-line on the vessel 1.

Figures 2, 3:
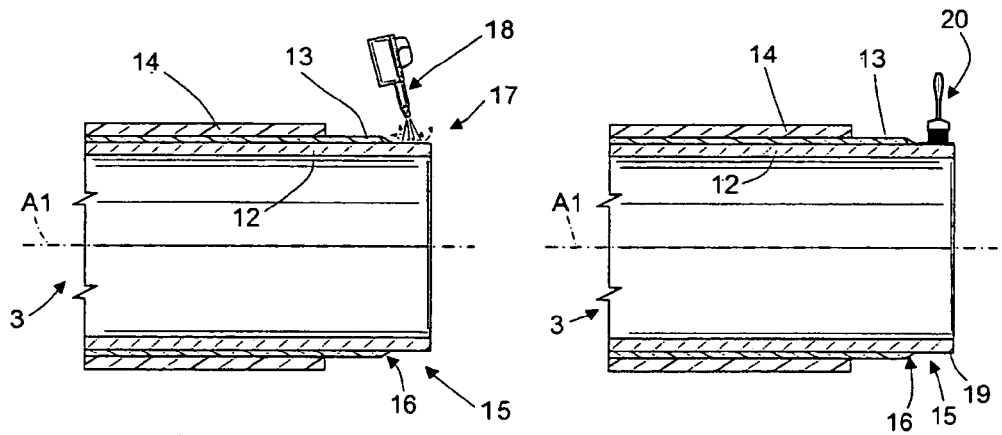
FIGS. 2 to 5 show sections, with parts removed for clarity, of pipes at various joining stages.

With reference to FIG. 2, each pipe 3 comprises a steel cylinder 12; a first coating 13, normally of polyethylene or polypropylene, contacting and for corrosionproofing steel cylinder 12; and a second coating 14 of Gunite or cement for weighing down underwater pipeline 2.

In an alternative embodiment not shown, the pipes have no second coating.

Each pipe 3 has two opposite end portions 15 (only one shown in FIGS. 2 and 3) with no first coating 13 and no second coating 14; and first coating 13 has a bevel 16 at each end portion 15.

Off firing line 8, each end portion 15 is roughened by blasting it with shot 17 to remove oxidation, scale and grease from the outer surface of end portion 15 and achieve the surface roughness necessary for follow-up operations. FIG. 2 only shows a gun 18 of a system, not shown in detail, for conveying, recovering, and filtering shot 17.

Alternatively, each end portion 15 is roughened using metal brushes.

In FIG. 3, the outer surface of end portion 15 is covered with a temporary protective sheath 19 for temporarily protecting end portion 15, and which may be applied in various ways, e.g. in the form of straps, films, strips, or bindings. In the FIG. 3 example, protective sheath 19 is applied off firing line 8 in paste form using a brush 20, so as to form, when set, a film on the outer surface of end portion 15.

Blasting with shot 17 (or brushing) and application of protective sheath 19 are performed at an on-land installation or on the deck of laying vessel 1, where more space is available than inside tunnel 5, and the dust produced by blasting with shot 17 can be removed more easily. Alternatively, the roughening process is performed in dedicated, appropriately equipped areas on deck.

Figure 4:
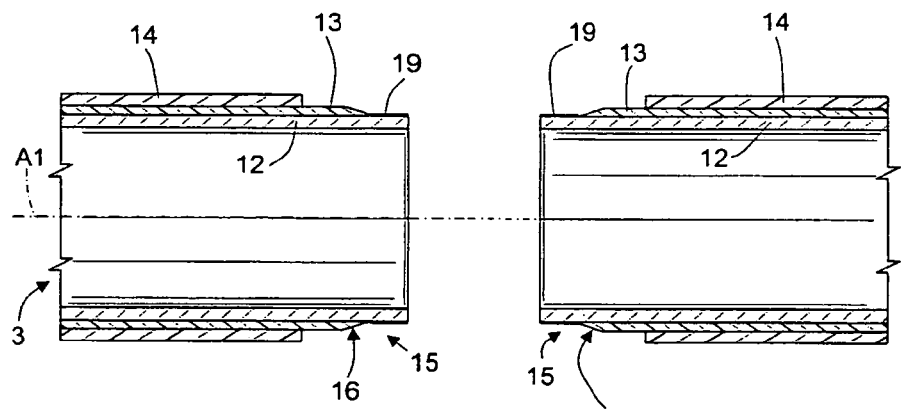
Figure 5:
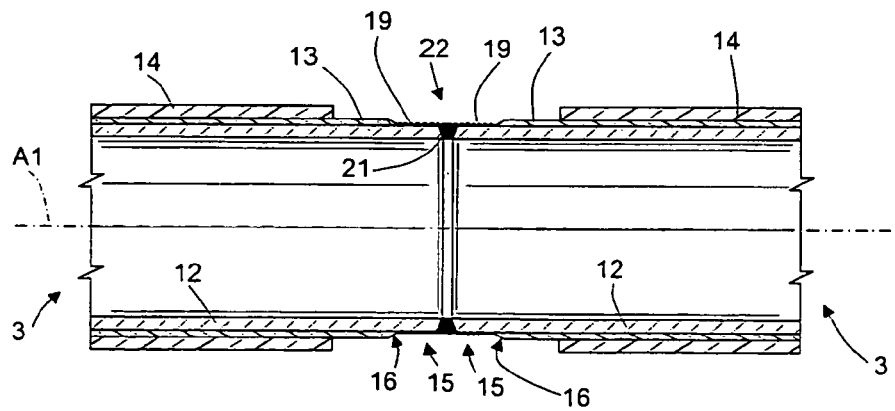

Pipes 3 on laying vessel 1 are fed to firing line 8 with end portions 15 already roughened and preferably covered with protective sheath 19. On firing line 8, two consecutive pipes 3, aligned along axis A1 (FIG. 4), are positioned with end portions 15 parallel, facing, and close together, and are welded—possibly in a number of weld passes at successive joining stations 9—to form an annular weld bead 21 between pipes 3 (FIG. 5). With reference to FIG. 5, two welded pipes 3 form a cutback 22 extending along axis A1, between two successive bevels 16 of first coating 13, and comprising two end portions 15 and annular weld bead 21. Welding normally removes protective sheath 19 close to annular weld bead 21.

In addition to welding cylinders 12, joining pipes 3 also comprises forming the protective joint coating by coating cutback 22 with polymer material, so that protective first coating 13 is substantially seamless along the whole of underwater pipeline 2. Similarly, the method also comprises forming a weighting joint coating, so that weighting second coating 14 is also substantially seamless along the whole of underwater pipeline 2. For the thermoplastic material to adhere to cutback 22, the outer surface of cutback 22 must be cryogenically blasted (mechanically cleaned) (FIG. 6), and cutback 22 induction heated to a temperature of 250° C. Once these operations are performed at a joining station 9, the method comprises applying a first coat 23, second coat 24, and third coat 25 of polymer material to cutback 22 in rapid succession (FIG. 7).

With reference to FIG. 7, first coat 23 is 100 to 500 microns thick, and is made of epoxy (FBE: Fusion Bonded Epoxy) resin applied in powdered form, using a spray gun not shown, to heated cutback 22 while it is still hot. Second coat 24 is 100 to 500 microns thick, and is made of a modified copolymer, normally a chemically modified polyethylene (CMPE) or a chemically modified polypropylene (CMPP), applied in powdered form about cutback 22, on top of first coat 23, using a spray gun not shown in the drawings. Third coat 25 is 2 to 5 mm thick and made of a modified copolymer, normally CMPE or CMPP.

Third coat 25 is subsequently covered with a coat C of cement or Gunite, as shown in FIG. 7.

With reference, to FIG. 6, cryogenic blasting provides for removing the rest of protective sheath 19 after welding, and any grease or other extraneous materials which may impair adhesion of first coat 23 to cutback 22, is substantially a cutback 22 surface cleaning operation, and comprises firing pellets 26 of dry ice at high speed onto the outer surface of cutback 22 by means of a gun 27. Dry-ice pellets 26 do not have the mass and consistency to alter the shape of the cutback surface, but are effective in removing the remaining protective sheath 19, dirt, and scale, and, what is more, sublimate after use and so do not need recovering.

Figure 8:
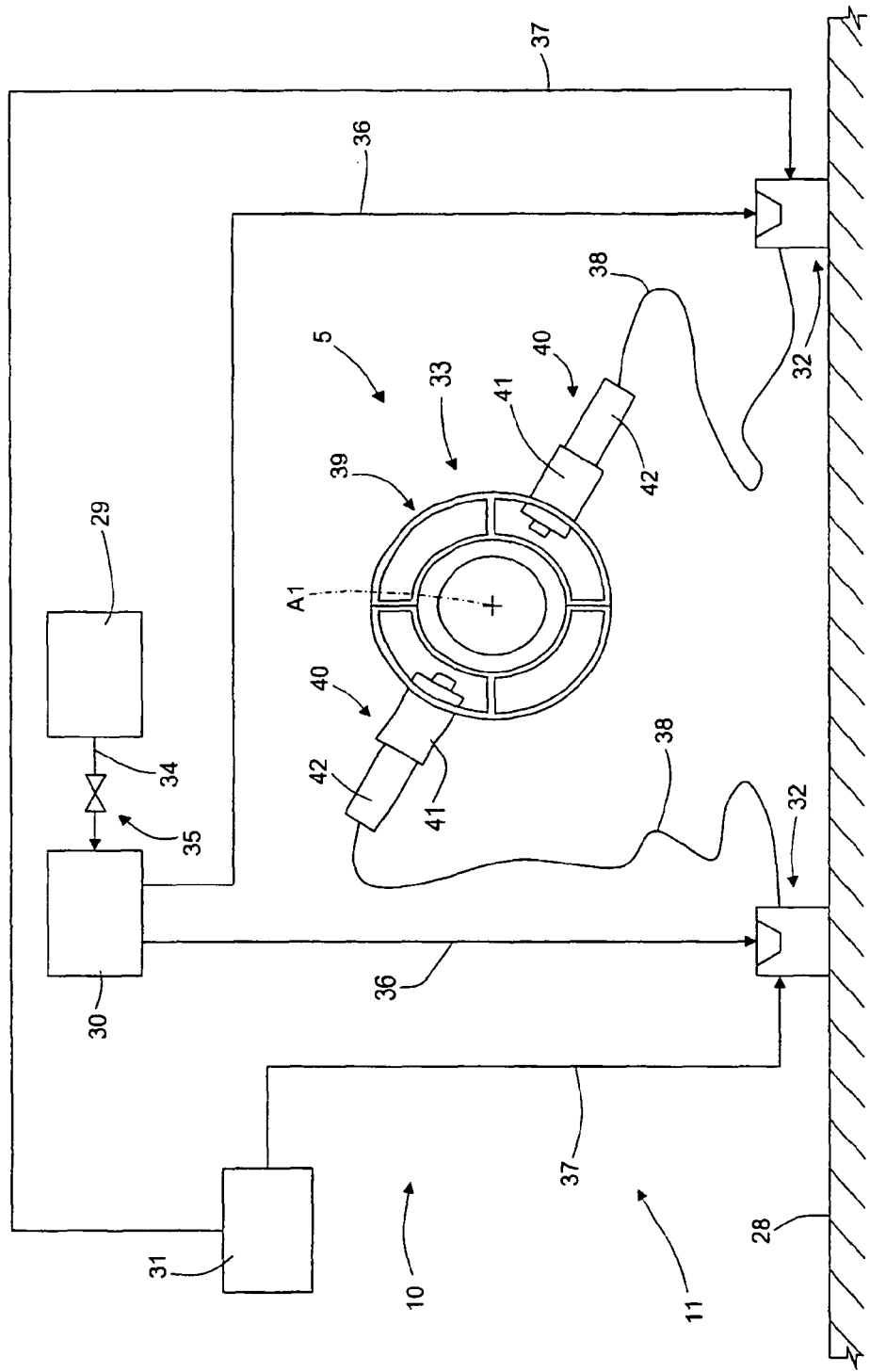
FIG. 8 shows a schematic front view, with parts removed for clarity, of a detail of a pipe-joining system in accordance with the present invention.

With reference to FIG. 8, cryogenic blasting unit 11 is located at least partly inside tunnel 5, of which FIG. 8 shows the supporting surface 28, and comprises a pressurized tank 29 of liquid carbon dioxide; a pellet-making device 30; a compressor 31; two mixing devices (microblasters) 32; and a blasting device 33 for firing pellets 26. In the example shown, tank 29 is defined by a battery of carbon dioxide cylinders preferably located outside tunnel 5, and which supply pellet-making device 30, preferably also located outside tunnel 5, along a line 34. Cryogenic blasting unit 11 also comprises a valve 35 along line 34; and pellets 26 produced by pellet-making device 30 are fed to the two mixing devices 32 along respective lines 36.

In the FIG. 8 example, compressor 31 forms part cryogenic blasting unit 11. In a variation, however, cryogenic blasting unit 11 has no dedicated compressor, and is supplied with compressed air by a utility compressor of pipe-laying vessel 1. Compressor 31 also need not necessarily be installed in tunnel 5.

Compressor 31 supplies mixing devices 32 over respective lines 37; and, in each mixing device, pellets 26 are mixed with compressed air and fed to blasting device 33 along a respective hose 38.

Blasting device 33 comprises two rings 39 (only one shown in FIG. 8) fitted about underwater pipeline 2, astride a cutback 22; and two blasters 40, each of which is supported by rings 39, and comprises a powered carriage 41, and a gun 42 for firing pellets 26 onto cutback 22. Rings 39 define an annular guide for powered carriages 41, which move selectively along an annular path defined by rings 39.

In a variation not shown, each ring comprises a metal band fixed to the underwater pipeline; and a rim fitted to the band to rotate about the axis of the underwater pipeline, and supporting one or more blasters, so only one drive is needed.

In another variation not shown, the cryogenic blasting unit comprises only one mixing device, which supplies both guns or comprises only one gun.

In another variation, the blasting device comprises only one user-gripped gun, and blasting is performed manually.

The invention claimed is:

1. A method of joining pipes to produce an underwater pipeline on a firing line comprises the steps of: welding the end portions of adjacent pipes to form cutbacks, each of which is defined by two end portions, and by an annular weld bead between the two end portions; forming a protective joint coating about each cutback; supplying the firing line with pipes having previously roughened end portions; and cleaning, by cryogenic blasting, the outer surface of each cutback along the firing line before applying the protective joint coating; wherein the firing line extends inside a tunnel, and comprises a number of joining stations equally spaced inside the tunnel; the step of cryogenic blasting being performed at a joining station inside the tunnel by a cryogenic blasting unit that includes portions that are located partly inside the tunnel and partly outside the tunnel.

2. The method as claimed in claim 1, including the further step of applying, off the firing line, a temporary protective sheath along the outer surface of each end portion.

3. The method as claimed in claim 2, wherein the protective sheath is applied in paste form.

4. The method as claimed in claim 1, wherein the roughening of the outer surface of each end portion of the pipes occurs by shot blasting, off the firing line, using metal shot.

5. The method as claimed in claim 1, wherein the roughening of the outer surface of each end portion of the pipes occurs by brushing.

6. The method as claimed in claim 1, wherein the step of cryogenic blasting comprises firing carbon dioxide pellets onto the outer surface of the cutback.

7. The method as claimed in claim 1, wherein the cryogenic blasting includes the further steps of feeding liquid carbon dioxide from a tank to a pellet-making device; producing solid carbon dioxide pellets in the pellet-making device; transferring the pellets to a mixing device; mixing the pellets with compressed air; and firing the pellets onto the cutback by means of a gun of a blasting device.

8. The method as claimed in claim 7, wherein the blasting device comprises two guide rings fixable about the underwater pipeline having an axis (A1); and the additional steps of moving a carriage, supported by said guide rings, along an annular path about the axis (A1); and selectively moving activating the gun by means of a blaster mounted on the carriage and supporting the gun.

9. A system for joining pipes to produce an underwater pipeline comprising a firing line for welding the end portions of adjacent pipes to form cutbacks, each defined by two end portions and by an annular weld bead between the two end portions, and for forming a protective joint coating about each cutback; and a cryogenic blasting unit for cleaning, by cryogenic blasting, the outer surface of each cutback along the firing line before forming the protective joint coating; wherein the end portions of the pipes are roughened before being fed to the firing line, and the cryogenic blasting unit includes portions that are located partly inside the tunnel and partly outside the tunnel.

10. The system as claimed in claim 9, wherein the cryogenic blasting unit comprises a gun for firing carbon dioxide pellets onto the outer surface of the cutback.

11. The system as claimed in claim 9, wherein the firing line extends inside a tunnel, and comprises a number of joining stations equally spaced inside the tunnel; and the cryogenic blasting is performed at a joining station inside the tunnel.

12. The system as claimed in claim 9, wherein the cryogenic blasting unit comprises a tank of carbon dioxide; a pellet-making device connected to the tank of carbon dioxide; a mixing device in which the pellets are mixed with compressed air; and a blasting device comprising at least one gun for firing the pellets onto the cutback.

13. The system as claimed in claim 12, wherein the blasting device comprises two rings fixable about the underwater pipeline; a carriage movable along an annular path about the axis (A1) of the underwater pipeline; and a blaster mounted on the carriage and which supports and selectively activates the at least one gun.

14. An underwater-pipeline-laying vessel including a system for joining pipes to produce an underwater pipeline comprising a firing line for welding the end portions of adjacent pipes to form cutbacks, each cutback defined by two end portions and by an annular weld bead between the two end portions, and for forming a protective joint coating about each cutback; a cryogenic blasting unit for cleaning, by cryogenic blasting, the outer surface of each cutback along the firing line before forming the protective joint coating; wherein the end portions of the pipes are roughened before being fed to the firing line, and the cryogenic blasting unit comprises a tank of carbon dioxide; a pellet-making device connected to the tank of carbon dioxide; a mixing device in which the pellets are mixed with compressed air; and a blasting device comprising at least one gun for firing the pellets onto the cutback, the firing line extending inside a tunnel, and comprising a plurality of joining stations equally spaced inside the tunnel, with cryogenic blasting being performed at a joining station inside the tunnel, and wherein the cryogenic blasting unit includes portions that are located partly inside the tunnel and partly outside the tunnel.

15. A system for joining pipes to produce an underwater pipeline comprising a firing line for welding the end portions of adjacent pipes to form cutbacks, each defined by two end portions and by an annular weld bead between the two end portions, and for forming a protective joint coating about each cutback; and a cryogenic blasting unit for cleaning, by cryogenic blasting, the outer surface of each cutback along the firing line before forming the protective joint coating; wherein the end portions of the pipes are roughened before being fed to the firing line, and the cryogenic blasting unit comprises a tank of carbon dioxide; a pellet making device connected to the tank of carbon dioxide; a mixing device in which the pellets are mixed with compressed air; and a blasting device comprising at least one gun for firing the pellets onto the cutback, wherein the blasting device comprises two rings fixable about the underwater pipeline; a carriage movable along an annular path about the axis (A1) of the underwater pipeline; and a gun mounted on the carriage and which supports and selectively moves the gun.

16. A system for joining pipes to produce a pipeline comprising a firing line for welding the end portions of adjacent pipes to form cutbacks, each defined by two end portions and by an annular weld bead between the two end portions, and for forming a protective joint coating about each cutback; and a cryogenic blasting unit for cleaning, by cryogenic blasting, the outer surface of each cutback along the firing line before forming the protective joint coating; wherein the end portions of the pipes are roughened before being fed to the firing line, and the cryogenic blasting unit comprises a tank of carbon dioxide; a pellet-making device connected to the tank of carbon dioxide; a mixing device in which the pellets are mixed with compressed air; and a blasting device, wherein the blasting device comprises two rings fixable about the underwater pipeline; a carriage movable along an annular path about the axis ($A1$) of the underwater pipeline; and a gun mounted on the carriage and which supports and selectively moves the gun.

* * * * *